United States Patent
Chiu

(10) Patent No.: US 10,525,355 B2
(45) Date of Patent: Jan. 7, 2020

(54) METHOD, DEVICE, AND NON-TRANSITORY COMPUTER READABLE STORAGE MEDIUM FOR INTERACTION TO EVENT IN VIRTUAL SPACE

(71) Applicant: HTC Corporation, Taoyuan (TW)

(72) Inventor: Wei-Cheng Chiu, Taoyuan (TW)

(73) Assignee: HTC Corporation, Taoyuan (TW)

(*) Notice: Subject to any disclaimer, the term of this patent is extended or adjusted under 35 U.S.C. 154(b) by 31 days.

(21) Appl. No.: 15/680,211

(22) Filed: Aug. 18, 2017

(65) Prior Publication Data
US 2018/0117470 A1   May 3, 2018

Related U.S. Application Data

(60) Provisional application No. 62/415,524, filed on Nov. 1, 2016.

(51) Int. Cl.
A63F 13/577   (2014.01)

(52) U.S. Cl.
CPC ...... *A63F 13/577* (2014.09); *A63F 2300/643* (2013.01); *A63F 2300/8082* (2013.01)

(58) Field of Classification Search
None
See application file for complete search history.

(56) References Cited

U.S. PATENT DOCUMENTS

| | | | |
|---|---|---|---|
| 2004/0034282 A1 | 2/2004 | Quaid, III | |
| 2009/0144664 A1* | 6/2009 | Kramer | G06T 19/20 715/852 |
| 2010/0309197 A1* | 12/2010 | Porwal | H04N 13/286 345/419 |
| 2011/0314381 A1 | 12/2011 | Fuller et al. | |
| 2012/0142415 A1 | 6/2012 | Lindsay | |
| 2013/0328762 A1 | 12/2013 | McCulloch et al. | |
| 2014/0149903 A1* | 5/2014 | Ahn | G06F 3/0488 715/765 |
| 2016/0342207 A1* | 11/2016 | Beran | G06F 3/011 |
| 2017/0337750 A1* | 11/2017 | McKenzie | G06T 19/20 |

FOREIGN PATENT DOCUMENTS

| | | |
|---|---|---|
| TW | 201250577 A | 12/2012 |
| TW | 201539305 A | 10/2015 |

OTHER PUBLICATIONS

Corresponding Taiwan office action dated Mar. 16, 2018.

* cited by examiner

*Primary Examiner* — James S. McClellan
*Assistant Examiner* — Peter J Iannuzzi
(74) *Attorney, Agent, or Firm* — CKC & Partners Co., LLC

(57) ABSTRACT

A processing method includes mapping a first physical object into a first virtual object in a virtual space; generating a collision signal in response to the first virtual object overlap a second virtual object in the virtual space; and providing the collision signal to the first physical object, so that the first physical object operates according to the collision signal.

17 Claims, 8 Drawing Sheets

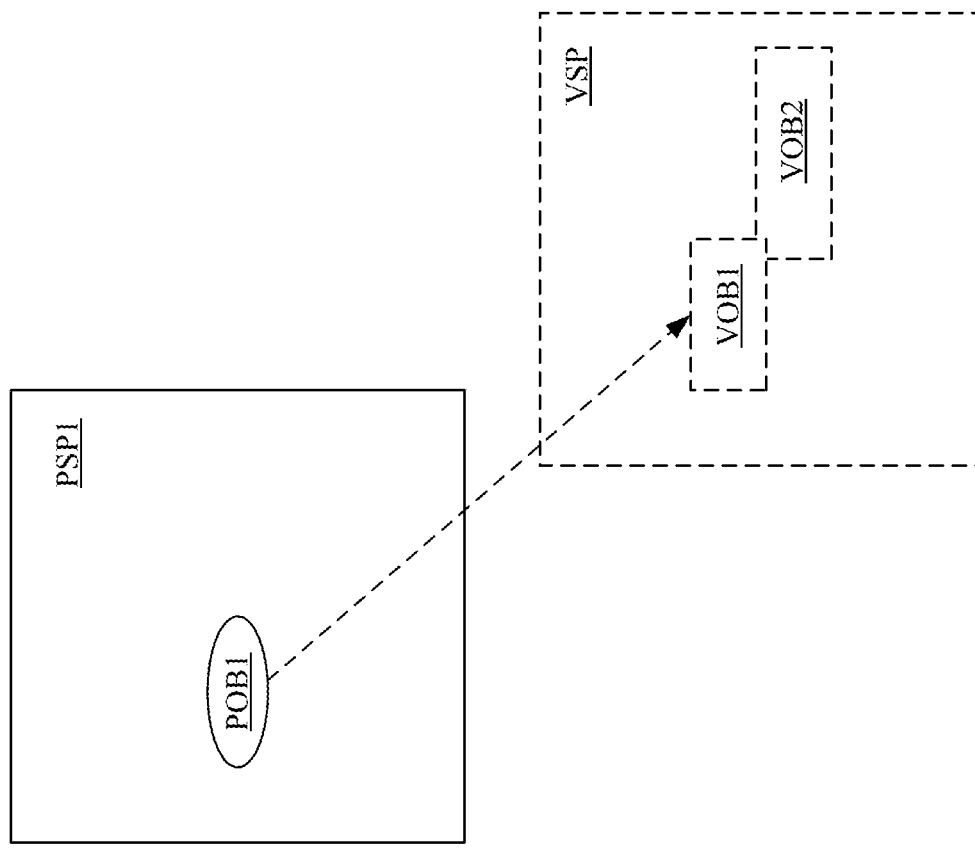

METHOD, DEVICE, AND NON-TRANSITORY COMPUTER READABLE STORAGE MEDIUM FOR INTERACTION TO EVENT IN VIRTUAL SPACE

RELATED APPLICATIONS

This application claims priority to U.S. Provisional Application Ser. No. 62/415,524, filed Nov. 1, 2016, which is herein incorporated by reference.

BACKGROUND

Technical Field

The present disclosure relates to a device, a method, and a non-transitory computer readable storage medium. More particularly, the present disclosure relates to an electronic device, a method, and a non-transitory computer readable storage medium for an interaction to an event in a virtual space.

Description of Related Art

With advances in technology, electronic devices for virtual spaces, such as virtual reality (VR) devices, are being increasingly used.

In some applications, for entertainment purposes, it is necessary for virtual objects interacting with each other in a virtual space. Hence, how to design events occurred between virtual objects and reactions corresponding to the events is an important area of research in this field.

SUMMARY

One aspect of the present disclosure is related to a method. In accordance with one embodiment of the present disclosure, the method includes mapping a first physical object into a first virtual object in a virtual space; generating a collision signal in response to the first virtual object overlap a second virtual object in the virtual space; and providing the collision signal to the first physical object, so that the first physical object operates according to the collision signal.

Another aspect of the present disclosure is related to an electronic device. In accordance with one embodiment of the present disclosure, the electronic device includes one or more processing components, memory, and one or more programs. The memory is electrically connected to the one or more processing components. The one or more programs are stored in the memory and configured to be executed by the one or more processing components. The one or more programs include instructions for mapping a first physical object into a first virtual object in a virtual space; generating a collision signal in response to the first virtual object overlap a second virtual object in the virtual space; and providing the collision signal to the first physical object, so that the first physical object operates according to the collision signal.

Another aspect of the present disclosure is related to a non-transitory computer readable storage medium. In accordance with one embodiment of the present disclosure, the non-transitory computer readable storage medium storing one or more programs includes instructions, which when executed, causes one or more processing components to perform operations including mapping a first physical object into a first virtual object in a virtual space; generating a collision signal in response to the first virtual object overlap a second virtual object in the virtual space; and providing the collision signal to the first physical object, so that the first physical object operates according to the collision signal.

Through the operations in one embodiment described above, the first physical object is able to react corresponding to the collision event in the virtual space, so that the entertainments of applications related to virtual spaces can be improved.

BRIEF DESCRIPTION OF THE DRAWINGS

The invention can be more fully understood by reading the following detailed description of the embodiments, with reference made to the accompanying drawings as follows:

FIG. 3A illustrates an illustrative example of operations of the electronic device in accordance with another embodiment of the present disclosure.

DETAILED DESCRIPTION

Figure 1:
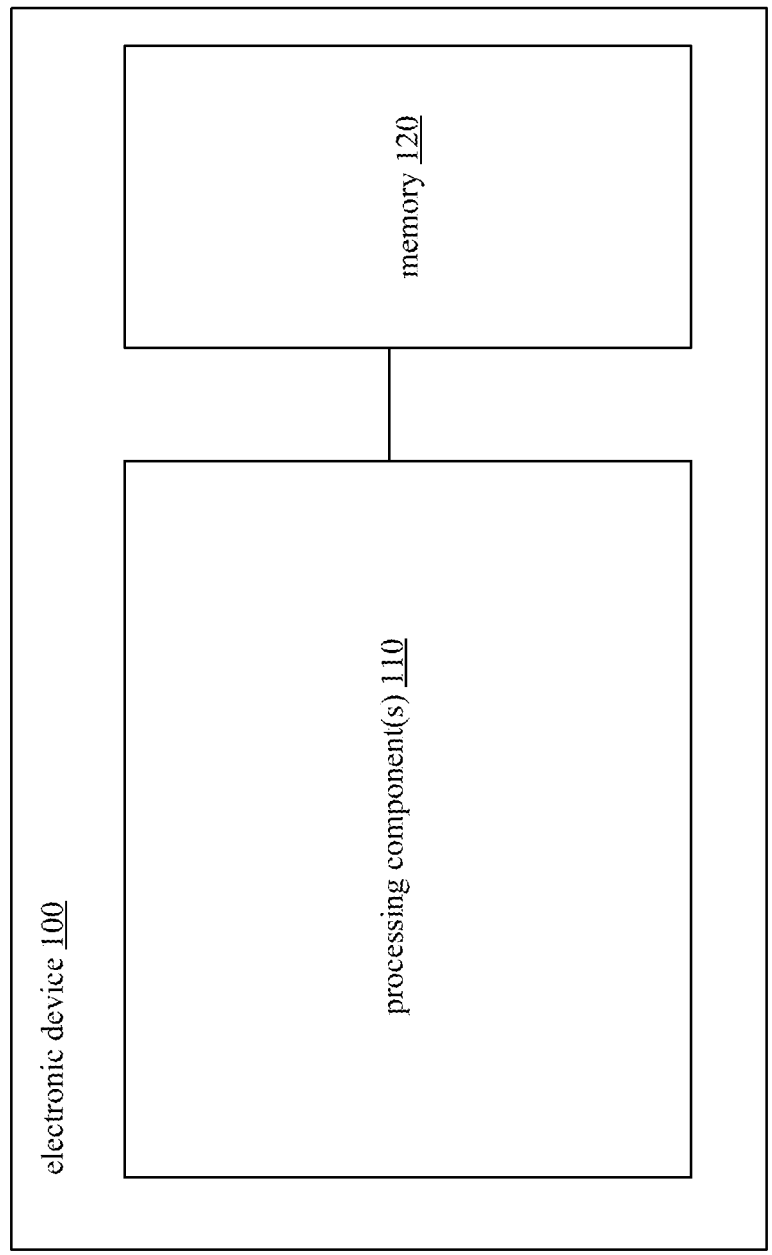
FIG. 1 is a schematic block diagram of an electronic device in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "electrically connected" or "electrically coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, the terms "around," "about," "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around," "about," "approximately" or "substantially" can be inferred if not expressly stated, or meaning other approximate values.

It will be understood that, in the description herein and throughout the claims that follow, the meaning of "a," "an," and "the" includes reference to the plural unless the context clearly dictates otherwise.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

FIG. 1 is a schematic block diagram of an electronic device 100 in accordance with one embodiment of the present disclosure. In this embodiment, the electronic device 100 includes one or more processing components 110 and a memory 120. In this embodiment, the processing component 110 is electrically connected to the memory 120.

In one embodiment, the one or more processing components 110 can be realized by, for example, one or more processors, such as central processors and/or microprocessors, but are not limited in this regard. In one embodiment, the memory 120 includes one or more memory devices, each of which comprises, or a plurality of which collectively comprise a computer readable storage medium. The memory 120 may include a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In one embodiment, the one or more processing components 110 may run or execute various software programs and/or sets of instructions stored in the memory 120 to perform various functions for the electronic device 100 and to process data.

It should be noted that the ways in which the devices and components in the electronic device 100 realized are not limited by the embodiments described above. In addition, the connections among these devices and components are not limited by the embodiments described above. Any configuration of these devices and components and interconnections there among that would enable the electronic device 100 to practice the technical features described below and/or in the claims can be used herein.

In one embodiment, the one or more processing components 110 communicate with a first physical object (e.g., a device) (e.g., the physical object POB1 in FIGS. 3A and 3B) in a physical space via a wire or wireless connection. In one embodiment, the one or more processing components 110 map the first physical object into a first virtual object (e.g., the virtual object VOB1 in FIGS. 3A and 3B) in a virtual space.

In one embodiment, the one or more processing components 110 may acquire a first physical position of the first physical object in the physical space. In one embodiment, the first physical position of the first physical object may be acquired from the first physical object or a device for positioning the first physical object. In one embodiment, the one or more processing components 110 may map the first physical position of the first physical object into a first virtual position of the first virtual object in the virtual space.

In one embodiment, the one or more processing components 110 may acquire a size of the first physical object. In one embodiment, the size of the first physical object may be predetermined or determined according to a command (e.g., a user command or a system command). In one embodiment, the one or more processing components 110 may map the size of the first physical object into a virtual size of the first virtual object in the virtual space. In one embodiment, the virtual size may be identical to or different from the size of the first physical object.

In one embodiment, after the mapping, the one or more processing components 110 generate a collision signal in response to the first virtual object overlap a second virtual object in the virtual space. In one embodiment, the collision signal indicates a collision event occurs in the virtual space. In one embodiment, the second virtual object is mapped from a second physical object. In one embodiment, the second virtual object is determined by the one or more processing components 110.

In one embodiment, the one or more processing components 110 may determine whether the first virtual object overlap the second virtual object and generate the collision signal according to one or more of the virtual position of the first virtual object, the virtual size of the first virtual object, a virtual position of the second virtual object, and the virtual size of the second virtual object.

In one embodiment, after the collision signal is generated, the one or more processing components 110 provide the collision signal to the first physical object, so that the first physical object operates according to the collision signal. In one embodiment, the first physical object may perform an impact operation according to the collision signal. In one embodiment, the first physical object may provide a tactile feedback, such as a vibration, according to the collision signal. In one embodiment, the first physical object may provide a flash or a sound according to the collision signal.

Through the operations in one embodiment described above, the first physical object is able to react corresponding to the collision event in the virtual space, so that the entertainments of applications related to virtual spaces can be improved.

Figure 2:
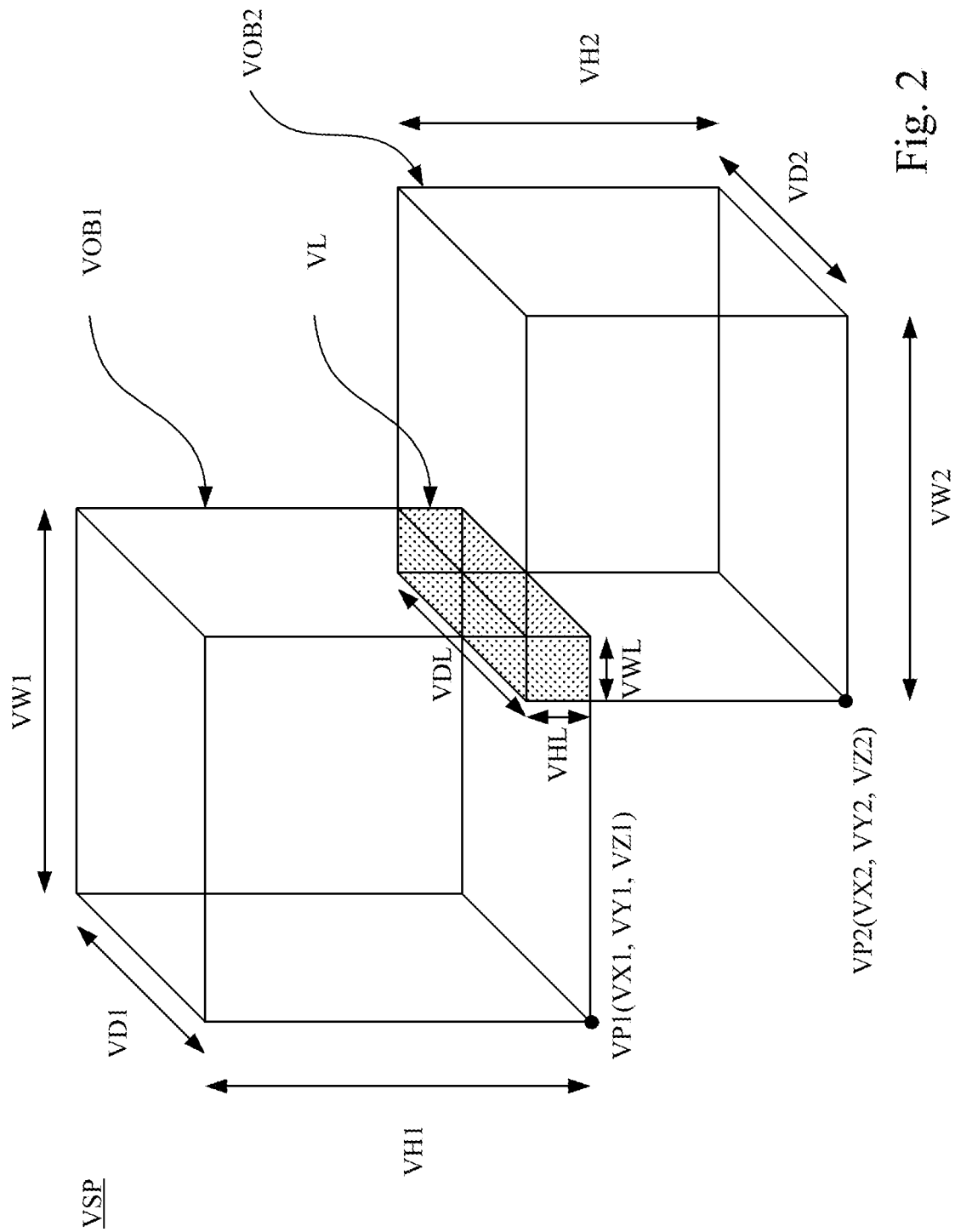
FIG. 2 illustrates an illustrative example of operations of the electronic device in accordance with one embodiment of the present disclosure.

Referring to FIG. 2, in this example, the first virtual object VOB1 and the second virtual object VOB2 are in the virtual space VSP. In this example, the first virtual object VOB1 has a virtual size with a width WD1, a height VH1, and a depth VD1. The first virtual object VOB1 has a virtual position VP1 with coordinates VX1, VY1, VZ1 on x-axis, y-axis, and z-axis in the virtual space VSP, respectively. The second virtual object VOB2 has a virtual size with a width WD2, a height VH2, and a depth VD2. The second virtual object VOB2 has a virtual position VP2 with coordinates VX2, VY2, VZ2 on x-axis, y-axis, and z-axis in the virtual space VSP, respectively.

In this example, the one or more processing components 110 determine that the first virtual object VOB1 overlap the second virtual object VOB2 with an overlapping region VL according to the virtual position VP1 of the first virtual object VOB1, the virtual size of the first virtual object VOB1, a virtual position VP2 of the second virtual object VOB2, and the virtual size of the second virtual object VOB2.

In one embodiment, the one or more processing components 110 may determine a collision force of force information in the collision signal corresponding to a volume of the overlapping region VL (e.g., a product of the width VWL of the overlapping region VL, the height VHL of the overlapping region VL, and the depth VDL of the overlapping region VL). For example, the larger the volume of the overlapping region VL, the greater the collision force.

In one embodiment, the overlapping region VL is detected during a collision period. The collision period starts once the first virtual object and the second virtual object collide with the other. In one embodiment, the collision period has a predetermined time length (e.g., 50 microseconds). In this case, the overlapping region VL will be detected in the first 50 microseconds since the first virtual object and the second virtual object collide with the other. The collision period is not limited to 50 microseconds. In another embodiment, the predetermined time length of the collision period can be 10 microseconds, 100 microseconds or any suitable time length.

In one embodiment, the first physical object operates according to force information in the collision signal. For example, the greater the collision force, the larger the strength of the vibration or the lighter the flash.

Through the operations in one embodiment described above, the first physical object is able to react corresponding to the volume of the overlapping region, so that the entertainments of applications related to virtual spaces can be improved.

Referring to FIG. 3A, in one embodiment, the one or more processing components 110 map the first physical object POB1 in the physical space PSP1 into the first virtual object VOB1 in the virtual space VSP. In one embodiment, the one or more processing components 110 determine the second virtual object VOB2 (e.g., the virtual position of the second virtual object VOB2 and/or the virtual size of the second virtual object VOB2) in the virtual space VSP. In one embodiment, the virtual object VOB2 may be determined according to a predetermined configuration, a user command, and/or a system command, but another manner is within the contemplated scope of the present disclosure.

Figure 3B:
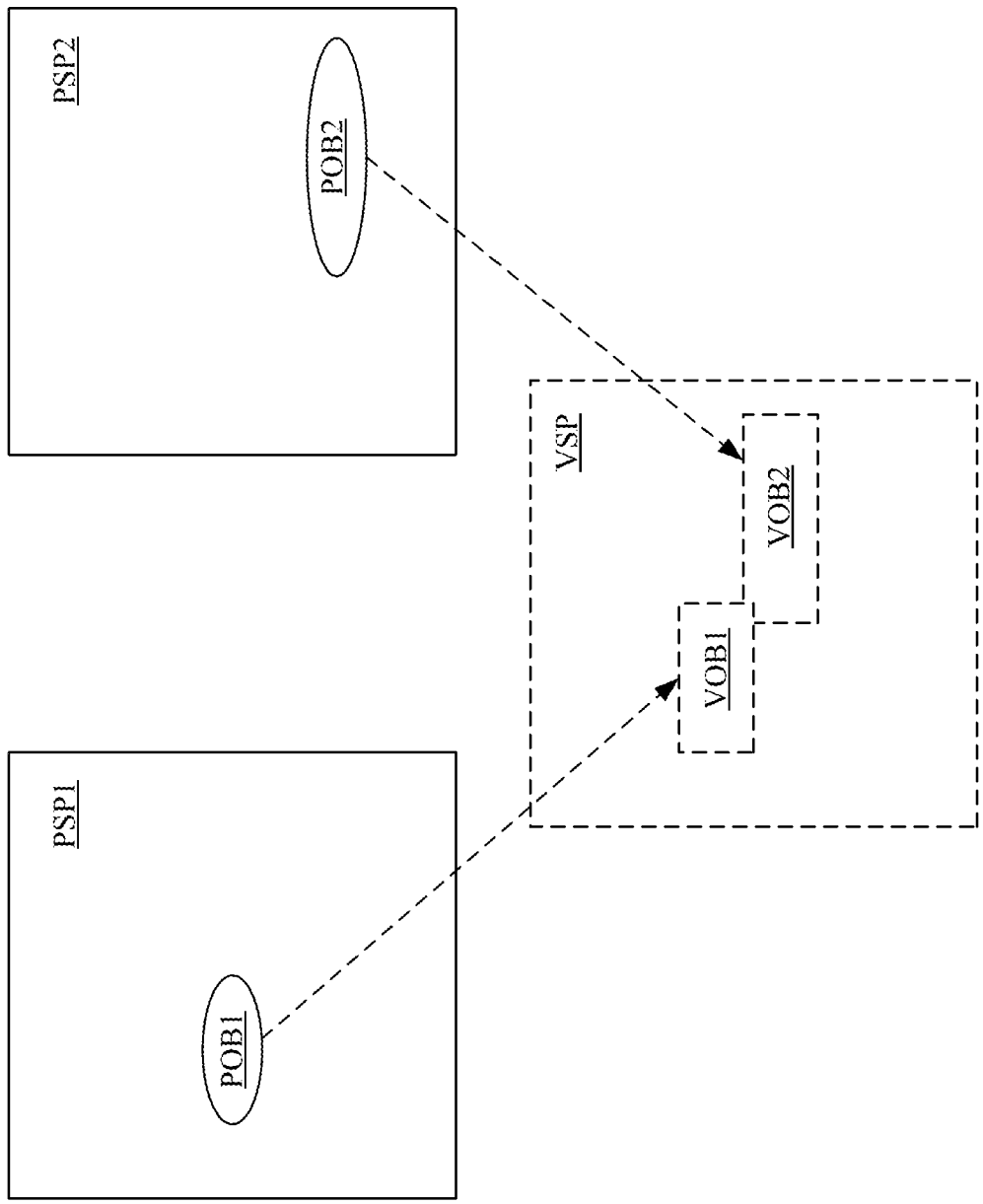
FIG. 3B illustrates an illustrative example of operations of the electronic device in accordance with another embodiment of the present disclosure.

Referring to FIG. 3B, in one embodiment, the one or more processing components 110 map the first physical object POB1 in the physical space PSP1 into the first virtual object VOB1 in the virtual space VSP and map the second physical object POB2 in the physical space PSP2 into the second virtual object VOB2 in the virtual space VSP. It should be noted that, the operation of mapping the second physical object POB2 into the second virtual object VOB2 are similar to the operation of mapping the first physical object POB1 into the first virtual object VOB1 described above, and many aspects that are similar will not be described herein.

In one embodiment, after the collision signal described above is generated, the one or more processing components 110 provide the collision signal to both of the first physical object POB1 and the second physical object POB2, so that the first physical object POB1 and the second physical object POB2 operate according to the collision signal. In one embodiment, the second physical object POB2 may perform an impact operation according to the collision signal. In one embodiment, the second physical object POB2 may provide a tactile feedback, such as a vibration, according to the collision signal. In one embodiment, the second physical object POB2 may provide a flash or a sound according to the collision signal.

In one embodiment, the first physical object POB1 and the second physical object POB2 may operate identically or differently. For example, the first physical object POB1 and the second physical object POB2 may vibrate according to the collision signal identically. As another example, the first physical object POB1 and the second physical object POB2 may vibrate according to the identical collision signal with different strengths. As another example, the first physical object POB1 may vibrate according to the collision signal and the second physical object POB2 may flash according to the identical collision signal.

It should be noted that, in one embodiment, the first physical object POB1 and the second physical object POB2 may be in an identical physical space, and the present disclosure is not limited to the embodiment described above.

In one embodiment, when the collision signal is generated (the first virtual object VOB1 and the second virtual object VOB2 are detected to be collided or overlapped to each other in the virtual space VSP as shown in FIG. 3B), the processing components 110 may modify the first virtual position or the second virtual position to avoid the collision between the first virtual object VOB1 and the second virtual object VOB2 in the virtual space VSP.

Figure 3C:
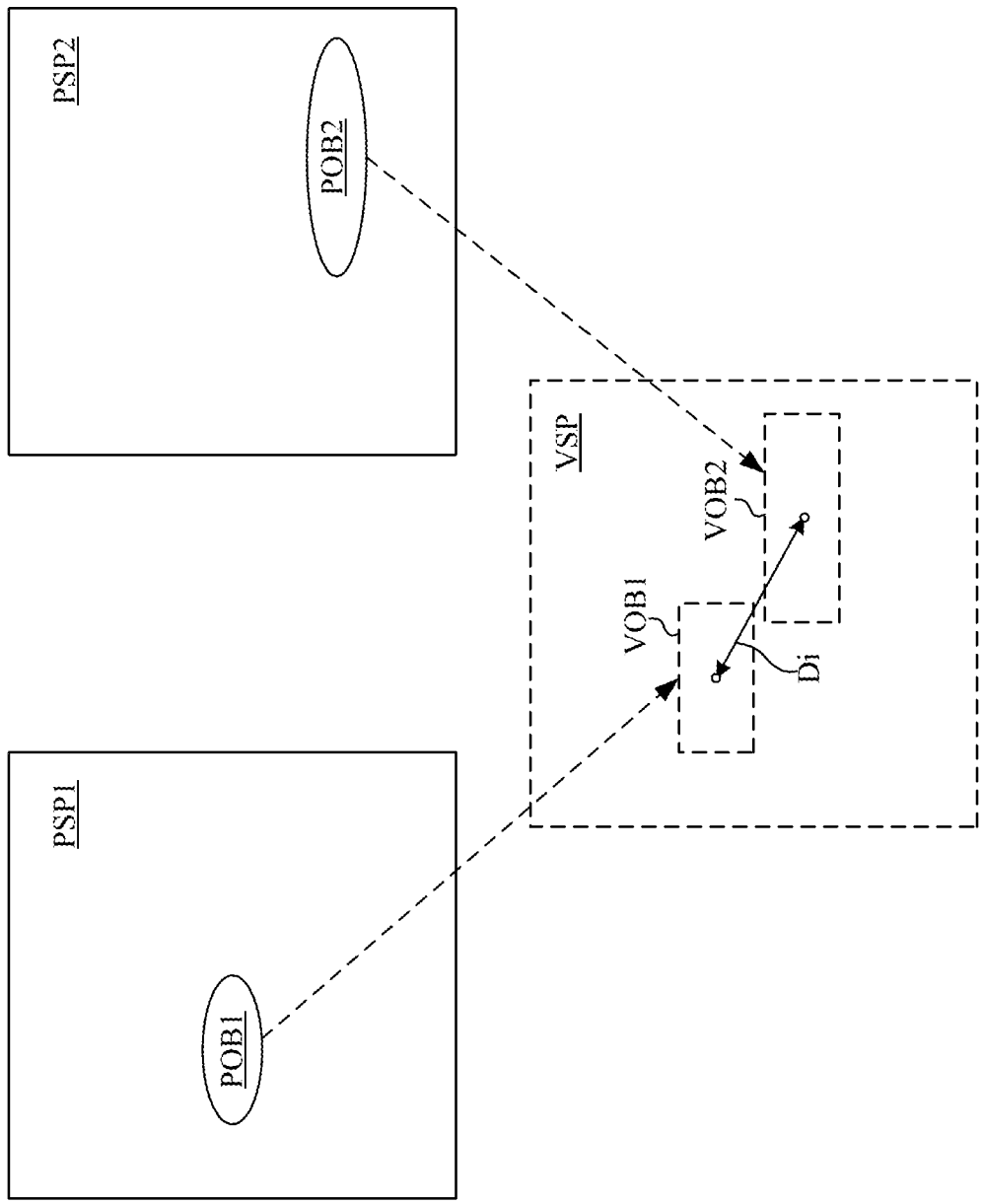
FIG. 3C illustrates an illustrative example of operations of the electronic device in accordance with another embodiment of the present disclosure.

Reference is further made to FIG. 3C, which is a schematic diagram illustrating a spatial relationship between the first virtual object VOB1 and the second virtual object VOB2 in the virtual space VSP according to another embodiment of the disclosure. As shown in FIG. 3C, when the processing components 110 maps the second physical position of the second physical object POB2 into the second virtual position of the second virtual object VOB2 in the virtual space VSP, the second virtual position of the second virtual object VOB2 is mapped at an initial distance Di from the first virtual position of the first virtual object VOB1. As mentioned above, the first physical position of the first physical object POB1 may be acquired from the first physical object POB1 or a device for positioning the first physical object POB1. In one embodiment, the initial distance Di is a predefined distance to separate the first virtual object VOB1 and the second virtual object VOB2 in the virtual space VSP, such that the first virtual object VOB1 and the second virtual object VOB2 will not be collided or overlapped to each other in the virtual space VSP.

Figure 4:
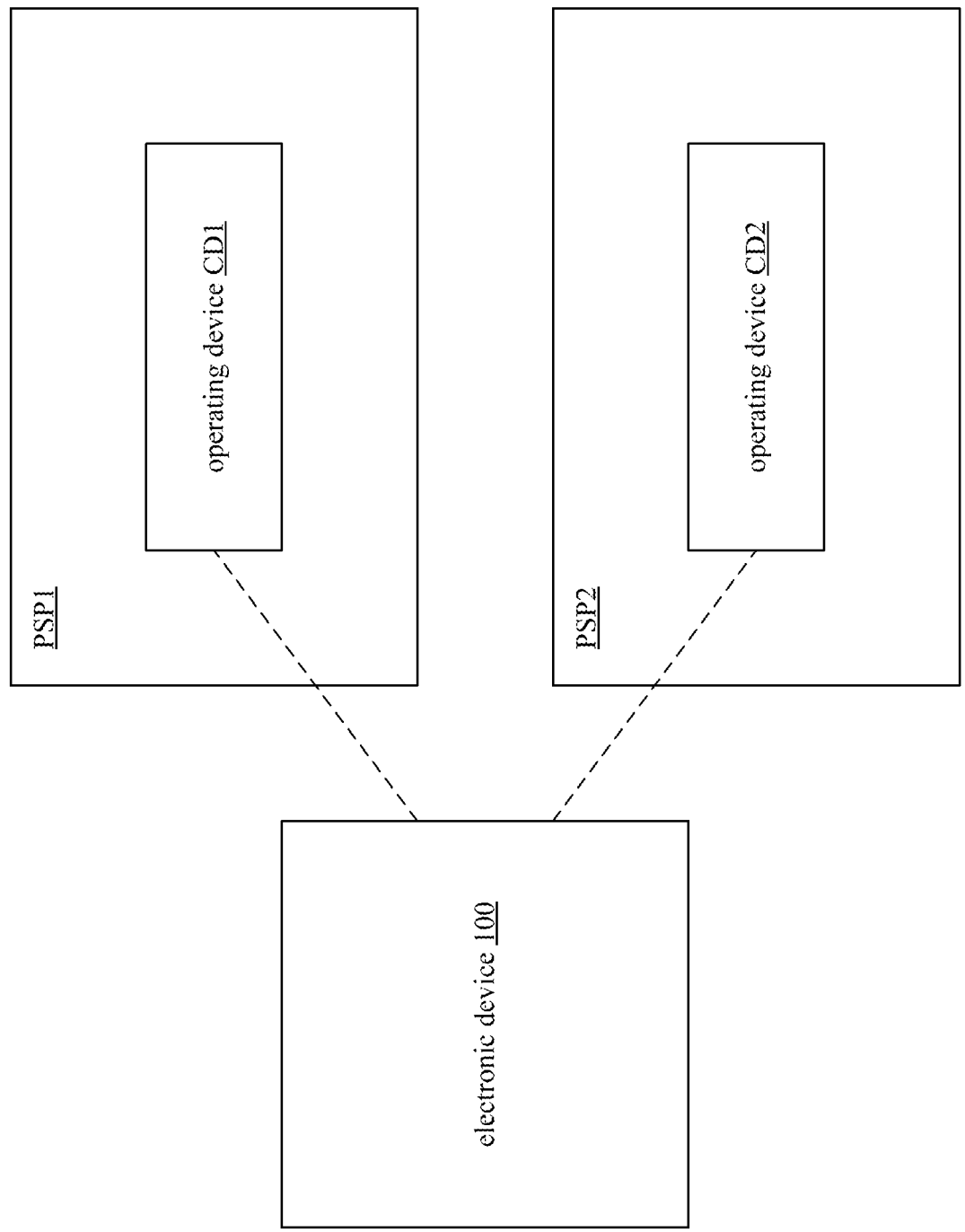
FIG. 4 illustrates an illustrative example of operations of the electronic device in accordance with one embodiment of the present disclosure.

Reference is made to FIG. 4. In one embodiment, the electronic device 100 may communicate with an operating device CD1 in a physical space PSP1 and an operating device CD2 in a physical space PSP2. In one embodiment, the operating device CD1 may be the first physical object POB1 described above, and the operating device CD2 may be the second physical object POB2 described above.

In one embodiment, the operating device CD1 may detect the physical position thereof by using one or more positioning devices disposed in the physical space PSP1. In one embodiment, the positioning devices may be lighthouse base stations. The operating device CD1 may receive lights from the lighthouse base stations for positioning itself. In one embodiment, the operating device CD1 may be realized by using a device with a lighthouse sensor.

In one embodiment, the operating device CD2 may detect the physical position thereof by using one or more positioning devices disposed in the physical space PSP2. The functions and dispositions of the positioning devices in the physical space PSP2 and the operating device CD2 are similar to the functions and dispositions of the positioning devices in the physical space PSP1 and the operating device CD1, and many aspects that are similar will not be described herein.

Through the disposition in one embodiment described above, the one or more processing components 110 can acquire the physical position of the operating device CD1 from the positioning devices in the physical space PSP1 or the operating device CD1, and/or acquire the physical position of the operating device CD2 from the positioning devices in the physical space PSP2 or the operating device CD2, so as to facilitate the mapping of the operating device CD1 and/or the operating device CD2.

It should be noted that, although two operating devices are described above, another number (e.g., one or three) of the operating devices in different physical spaces is within the contemplated scope of the present disclosure.

Through one embodiment described above, a user of the operating devices CD1 can get a feedback corresponding to the collision event in the virtual space. For example, in a car racing game, the user of the operating device CD1 can get a feedback (e.g., a vibration) when a virtual car corresponding to the operating device CD1 run into a virtual object in the virtual space.

Through one embodiment described above, different users in different physical spaces may interact with each other via the collision event in the virtual space. For example, in a car racing game, the users of the operating devices CD1, CD2 can get feedbacks when virtual cars corresponding to the operating devices CD1, CD2 run into with each other in the virtual space.

In such a manner, the entertainments of applications related to a virtual space can be improved.

Figure 5:
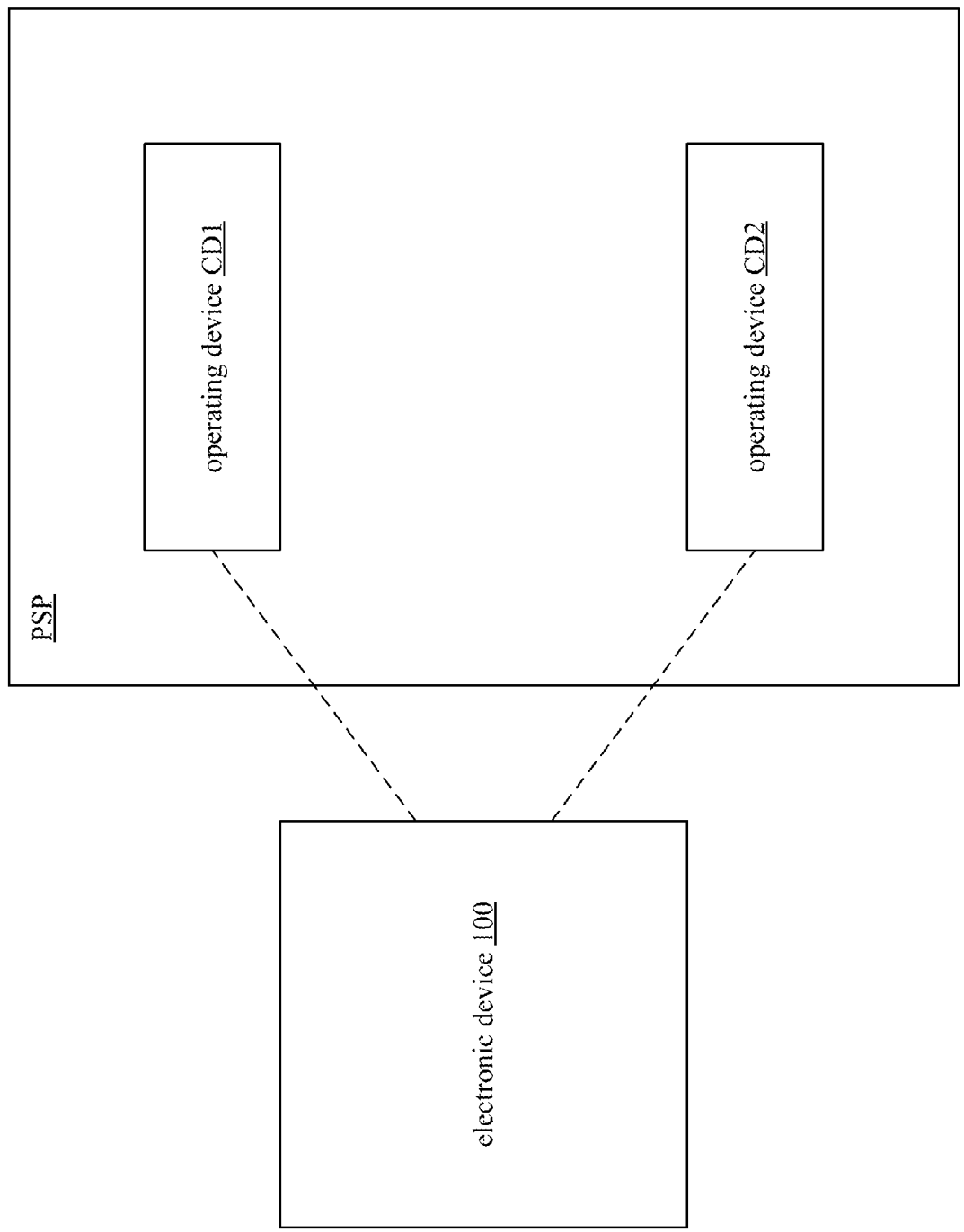
FIG. 5 illustrates an illustrative example of operations of the electronic device in accordance with one embodiment of the present disclosure.

Reference is made to FIG. 5. In one embodiment, the operating devices CD1, CD2 may be in a same space PSP. In this embodiment, both the operating devices CD1 CD2 may respectively detect the physical positions thereof by using one or more positioning devices disposed in the physical space PSP. In one embodiment, the positioning devices may be lighthouse base stations. The operating devices CD1, CD2 may receive lights from the lighthouse base stations for positioning themselves. In one embodiment, one or more of the operating devices CD1, CD2 may be realized by using devices with lighthouse sensors.

Through the disposition in one embodiment described above, the one or more processing components 110 can acquire the physical position of the operating device CD1 from the positioning devices in the physical space PSP1 or the operating device CD1, and/or acquire the physical position of the operating device CD2 from the positioning devices in the physical space PSP2 or the operating device CD2, so as to facilitate the mapping of the operating device CD1 and/or the operating device CD2.

It should be noted that, although two operating devices are described above, another number (e.g., three or more) of the operating devices in the physical space PSP is within the contemplated scope of the present disclosure.

Through the disposition in one embodiment described above, different users in an identical space may interact with each other via the collision event in the virtual space.

In some embodiments of the present disclosure, the one or more processing components 110 generate an informing signal in response to a distance between the operating devices CD1, CD2 be lower than a predetermined threshold. In one embodiment, the one or more processing components 110 provide the informing signal to one or more displaying devices corresponding to one or more of the operating devices CD1, CD2, so as to enable the one or more displaying devices to display distance information according to the informing signal. In one embodiment, the one or more displaying devices may be realized by one or more head mounted display, but other display, such as monitors are within the contemplated scope of the present disclosure. In one embodiment, the distance information may be a message indicating that the operating device CD1 is adjacent to the operating device CD2, but other information is within the contemplated scope of the present disclosure.

Through the operations in one embodiment described above, a user may be informed when the operating device CD1 adjacent to the operating device CD2.

Details of the present disclosure are described in the paragraphs below with reference to a processing method in FIG. 6. However, the present disclosure is not limited to the embodiment below.

It should be noted that the processing method can be applied to an electronic device having a structure that is the same as or similar to the structure of the electronic device 100 shown in FIG. 1. To simplify the description below, the embodiment shown in FIG. 1 will be used as an example to describe the processing method according to an embodiment of the present disclosure. However, the present disclosure is not limited to application to the embodiment shown in FIG. 1.

It should be noted that, in some embodiments, the processing method may be implemented as a computer program. When the computer program is executed by a computer, an electronic device, or the one or more processing components 110 in FIG. 1, this executing device performs the processing method. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the following processing method, no particular sequence is required unless otherwise specified. Moreover, the following operations also may be performed simultaneously or the execution times thereof may at least partially overlap.

Furthermore, the operations of the following processing method may be added to, replaced, and/or eliminated as appropriate, in accordance with various embodiments of the present disclosure.

Figure 6:
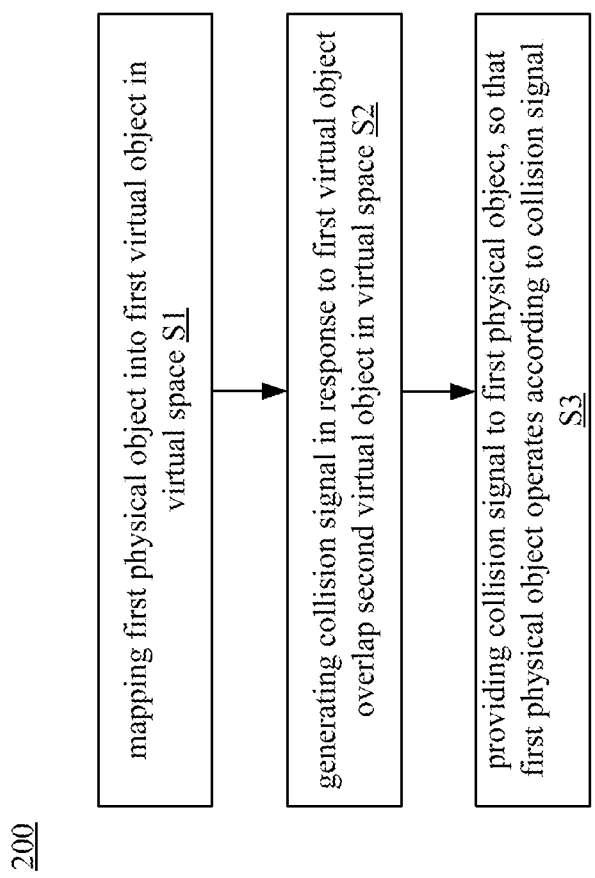
FIG. 6 is a flowchart of a processing method in accordance with one embodiment of the present disclosure.

Reference is made to FIGS. 1 and 6. The processing method 200 includes the operations below.

In operation S1, the one or more processing components 110 map a first physical object into a first virtual object in a virtual space.

In operation S2, the one or more processing components 110 generate a collision signal in response to the first virtual object overlap a second virtual object in the virtual space.

In operation S3, the one or more processing components 110 provide the collision signal to the first physical object, so that the first physical object operates according to the collision signal.

It should be noted that details of the processing method 200 can be ascertained with reference to the paragraph described above, and a description in this regard will not be repeated herein.

Through the operations in one embodiment described above, the first physical object is able to react corresponding to the collision event in the virtual space, so that the entertainments of applications related to virtual spaces can be improved.

Although the present invention has been described in considerable detail with reference to certain embodiments thereof, other embodiments are possible. Therefore, the scope of the appended claims should not be limited to the description of the embodiments contained herein.

What is claimed is:

1. A VR interactive processing method, comprising:
    mapping a first physical object in a first physical space into a first virtual object in a virtual space;
    mapping a first physical position of the first physical object into a first virtual position in the virtual space;
    mapping a second physical object in a second physical space different from the first physical space into a second virtual object in the virtual space;
    mapping a second physical position of the second physical object into a second virtual position in the virtual space, wherein the first physical position of the first physical object is obtained from the first physical object, and the second physical position of the second physical object is obtained from the second physical object;
    generating a collision signal in response to the first virtual object overlap the second virtual object in the virtual space;
    determining force information in the collision signal according to a volume of an overlapping region of the first virtual object and the second virtual object; and
    providing the collision signal to the first physical object, so that the first physical object operates according to the collision signal.

2. The VR interactive processing method of claim 1 further comprising:
    providing the collision signal to the second physical object, so that the second physical object operates according to the collision signal.

3. The VR interactive processing method of claim 1, wherein the operation of generating the collision signal comprises:
    detecting the overlapping region during a collision period, wherein the collision period starts once the first virtual object and the second virtual object collide with the other.

4. The VR interactive processing method of claim 1, wherein an initial distance is predefined between the first virtual position and the second virtual position.

5. The VR interactive processing method of claim 1, wherein the operation of mapping the first physical object into the first virtual object in the virtual space comprises:
    mapping a size of the first physical object into a virtual size in the virtual space.

6. An electronic device comprising:
    one or more processing components;
    a memory electrically connected to the one or more processing components; and
    one or more programs, wherein the one or more programs are stored in the memory and configured to be executed by the one or more processing components, the one or more programs comprising instructions for:
        mapping a first physical object in a first physical space into a first virtual object in a virtual space;
        mapping a first physical position of the first physical object into a first virtual position in the virtual space;
        mapping a second physical object in a second physical space different from the first physical space into a second virtual object in the virtual space;
        mapping a second physical position of the second physical object into a second virtual position in the virtual space, wherein the first physical position of the first physical object is obtained from the first physical object, and the second physical position of the second physical object is obtained from the second physical object;
        generating a collision signal in response to the first virtual object overlap the second virtual object in the virtual space;
        determining force information in the collision signal according to a volume of an overlapping region of the first virtual object and the second virtual object; and
        providing the collision signal to the first physical object, so that the first physical object operates according to the collision signal.

7. The electronic device as claimed in claim 6, wherein the one or more programs further comprises instructions for:
    providing the collision signal to the second physical object, so that the second physical object operates according to the collision signal.

8. The electronic device as claimed in claim 6, wherein the one or more programs further comprises instructions for:
    detecting the overlapping region during a collision period, wherein the collision period starts once the first virtual object and the second virtual object collide with the other.

9. The electronic device as claimed in claim 6, wherein an initial distance is predefined between the first virtual position and the second virtual position.

10. The electronic device as claimed in claim 6, wherein the one or more programs further comprises instructions for:
    mapping a size of the first physical object into a virtual size in the virtual space.

11. A non-transitory computer readable storage medium storing one or more programs comprising instructions, which when executed, causes one or more processing components to perform operations comprising:
    mapping a first physical object in a first physical space into a first virtual object in a virtual space;
    mapping a first physical position of the first physical object into a first virtual position in the virtual space;

mapping a second physical object in a second physical space different from the first physical space into a second virtual object in the virtual space;

mapping a second physical position of the second physical object into a second virtual position in the virtual space, wherein the first physical position of the first physical object is obtained from the first physical object, and the second physical position of the second physical object is obtained from the second physical object;

generating a collision signal in response to the first virtual object overlap the second virtual object in the virtual space;

determining force information in the collision signal according to a volume of an overlapping region of the first virtual object and the second virtual object; and providing the collision signal to the first physical object, so that the first physical object operates according to the collision signal.

12. The non-transitory computer readable storage medium as claimed in claim 11 comprising instructions, which when executed, causes one or more processing components to further perform operations comprising:

providing the collision signal to the second physical object, so that the second physical object operates according to the collision signal.

13. The non-transitory computer readable storage medium as claimed in claim 11 comprising instructions, which when executed, causes one or more processing components to further perform operations comprising:

predefining an initial distance between the first virtual position and the second virtual position.

14. The non-transitory computer readable storage medium as claimed in claim 11 comprising instructions, which when executed, causes one or more processing components to further perform operations comprising:

mapping a size of the first physical object into a virtual size in the virtual space.

15. A VR interactive processing system comprising:

a first lighthouse base station disposed in a first physical space, wherein the first lighthouse base station emits a first light;

a second lighthouse base station disposed in a second physical space different from the first physical space, wherein the second light base station emits a second light;

a first operating device disposed in the first physical space, wherein the first operating device comprises a first lighthouse sensor for receiving the first light to perform positioning of the first operating device and obtain a first physical position of the first operating device in the first physical space;

a second operating device disposed in the second physical space, wherein the second operating device comprises a second lighthouse sensor for receiving the second light to perform positioning of the second operating device and obtain a second physical position of the second operating device in the second physical space; and an electronic device which communicates with the first operating device and the second operating device, the electronic device comprising:

a memory which stores one or more programs; and a processor electrically connected to the memory, wherein the processor acquires the first physical position from the first operating device and the second physical position from the second operating device, and is configured to execute the one or more programs to perform steps of a VR interactive processing method comprising:

mapping the first operating device in the first physical space into a first virtual object in a virtual space according to the first physical position;

mapping the second operating device in the second physical space into a second virtual object in the virtual space according to the second physical position;

generating a collision signal in response to the first virtual object overlapping the second virtual object in the virtual space;

determining force information in the collision signal according to a volume of an overlapping region of the first virtual object and the second virtual object; and providing the collision signal to the first operating device and second operating device;

wherein the first operating device and the second operating device operate according to the collision signal.

16. The VR interactive processing system of claim 15, wherein the first virtual object is mapped at a first virtual position in the virtual space, the second virtual object is mapped at a second virtual position in the virtual space, and the second virtual position is at an initial distance from the first virtual position to separate the first and second virtual objects in the virtual space.

17. The VR interactive processing system of claim 16, wherein the initial distance is established in an initial state when the second virtual object is mapped at the second virtual position in the virtual space.

* * * * *